United States Patent [19]
Chiao

[11] Patent Number: 6,071,565
[45] Date of Patent: Jun. 6, 2000

[54] WATER-BORNE EPOXY RESIN COATING COMPOSITION

[75] Inventor: Yi-Hung Chiao, Midland, Mich.

[73] Assignee: The Dow Chemical Company, Midland, Mich.

[21] Appl. No.: 09/062,917

[22] Filed: Apr. 20, 1998

Related U.S. Application Data

[60] Provisional application No. 60/053,096, Jul. 11, 1997.

[51] Int. Cl.[7] ........................................ B05B 3/02
[52] U.S. Cl. .......................... 427/386; 428/418; 523/404
[58] Field of Search ........................... 523/404; 427/386; 428/418

[56] References Cited

U.S. PATENT DOCUMENTS

| | | | |
|---|---|---|---|
| 4,436,848 | 3/1984 | Haines et al. | 523/426 |
| 4,487,861 | 12/1984 | Winner | 523/428 |
| 4,963,602 | 10/1990 | Patel | 523/403 |
| 5,344,856 | 9/1994 | Klein | 523/403 |
| 5,602,193 | 2/1997 | Stark | 523/403 |
| 5,616,634 | 4/1997 | Pfeil et al. | 523/404 |

FOREIGN PATENT DOCUMENTS

| | | |
|---|---|---|
| 491 550 A2 | 6/1992 | European Pat. Off. . |
| 508 536 A1 | 10/1992 | European Pat. Off. . |

OTHER PUBLICATIONS

Lee & Neville, Handbook of Epoxy Resins, 14–2 through 14–4, 1967.
S. Kojima et al; "Development of High Performance, Water-–Based Emulsion Coatings For Can Coatings Application;" *J. Coating Technology*; vol. 65; Mar. 1993.
F. H. Walker et al. "A New, Self–Emulsifying Curing Agent Technology for Two Component, Waterborne Epoxy Formulations", Presented at the Waterborne, High–Solids, and Powder Coatings Symposium; Feb. 22–24, 1995.

*Primary Examiner*—Robert Dawson
*Assistant Examiner*—D. Aylward
*Attorney, Agent, or Firm*—Kevin J. Nilsen

[57] ABSTRACT

A water-borne epoxy resin coating composition comprised of: (a) particles of an epoxy resin having a neutral or positive surface charge dispersed in (b) water, an amount of (c) surfactant sufficient to disperse the epoxy resin in the water, the surfactant being a nonionic surfactant, amphoteric surfactant or mixture thereof and (d) a latent curing agent, may be applied to a metal substrate absent a primer coating and, subsequently, heated to form a cured coating on the substrate. The latent curing agent is (i) at least partially dissolved in the water, (ii) essentially insoluble with the epoxy resin and (iii) present in a sufficient amount to cure the epoxy resin. An example of a suitable latent curing agent is dicyandiamide. The cured coating displays excellent adherence, wear resistance and resistance to solvents such as acetone, a 1N HCl solution and a 1N KOH solution.

22 Claims, No Drawings

WATER-BORNE EPOXY RESIN COATING COMPOSITION

CROSS-REFERENCE TO RELATED APPLICATION

This application claims the benefit of U.S. Provisional Application No. 60/053,096, filed Jul. 11, 1997.

FIELD OF THE INVENTION

The invention relates to a coating composition comprised of an epoxy resin dispersed in water. In particular, the invention relates to a water emulsified epoxy resin coating composition for metal objects.

BACKGROUND OF THE INVENTION

Organic solvent based epoxy resins for coating objects to improve corrosion resistance and moisture resistance is well-known. Organic solvent based epoxy resins have, for example, been used to coat cans to prevent corrosion of the can from the atmosphere or contents of the can.

More recently due to environmental concerns, water borne epoxy resins have been developed. In general, water borne epoxy resins can be split into two categories: (I) those using liquid epoxy resins (i.e., those having less than about 500 molecular weight) and (II) those using solid epoxy resins (i.e., those having a molecular weight of greater than about 500 molecular weight).

However, most water borne epoxy resins and, in particular, those containing solid epoxy resins have utilized some organic solvent to disperse and enhance coalescence of the dispersed particles upon being coated onto a substrate. In the absence of a solvent, the epoxy resin particles generally fail to coalesce sufficiently to provide a coating suitable, for example, to prevent corrosion of a metal can.

Because water catalyzes the epoxy resin-curing agent reaction, water based epoxy resin coatings have tended to have a short pot life (i.e., limited time to apply the coating composition before it gels in the pot after mixing in the curing agent). In particular, coating compositions containing liquid epoxy resins and aliphatic amine curing agents, such as polyethylene amine, have suffered from very short pot life. In general, to somewhat compensate for this problem, the curing agent or hardner is usually made by reacting, for example, the polyethylene amine with (i) fatty acids, (ii) dimer acids or (iii) epoxy resin, followed by a treatment to reduce the primary amine content. Because of the strong catalytic effect of water on the amine epoxy reaction, the above modification to the amine is almost always employed. Even with the above modification, the pot life is generally less than 3 hours.

To aid in emulsification of the epoxy resin and pot life of liquid epoxy resins, these resins generally have required the grafting of dispersing moieties (e.g., alkylene oxides chains) to epoxy resins and, in particular, type (II) resins. The incorporation of dispersing moieties increases the cost significantly due to the complicated chemistry and processing to form a stable dispersion or emulsion.

Due to decreased stability of the water based epoxy emulsion or dispersion, inorganic pigments useful in improving the aesthetics or corrosion of the metal substrate or wear of the coating generally have not been used in these compositions. This instability is especially evident when the curing agent, such as an amine, is combined with the water-based epoxy resin composition. The curing agent, such as an amine, tend to be basic and, thus, can cause the emulsification or dispersion of the epoxy and/or pigment to coagulate.

Thus, it would be desirable to provide a water-borne epoxy resin coating composition that avoids one or more of the aforementioned problems with these coating compositions.

SUMMARY OF THE INVENTION

A first aspect of this invention is a water-borne epoxy resin coating composition comprised of,
(a) particles of an epoxy resin having a neutral or positive surface charge dispersed in (b) water, (c) an amount of surfactant sufficient to disperse the epoxy resin in the water, the surfactant being a nonionic surfactant, amphoteric surfactant or mixture thereof and (d) a latent curing agent that is (i) at least partially dissolved in the water, (ii) essentially insoluble with the epoxy resin and (iii) present in a sufficient amount to cure the epoxy resin.

A second aspect of this invention is a method of coating a metal substrate, the method comprising:
applying the coating composition of the first aspect of this invention to at least a portion of the metal substrate to form a substrate having an applied coating and
heating the metal substrate having the applied coating to a temperature sufficient to cure the coating composition into a cured coating adhered to the metal substrate.

A third aspect of this invention is a metal article comprising a cured coating of the coating composition of the first aspect of this invention adhered to at least a portion of a metal substrate.

The coating composition is useful for coating metal articles, such as a cast iron brake rotor, metal cans of all sorts and other metal articles, where corrosion inhibition or improved coating wear may be desired. The coating composition, according to this invention, may also incorporate pigments, such as ceramic fillers, while still maintaining stability of the emulsion resin. The coating invention displays exceptionally long pot life and minimal or no adverse affect on the environment (i.e., volatile organic compounds "VOCs," such as organic solvents, are not necessary to form the coating composition even though they may be employed, if desired). The coating composition also forms uniform corrosion and wear resistant coatings, particularly, when a ceramic filler is included in the coating composition.

DETAILED DESCRIPTION OF THE INVENTION

The Coating Composition

The coating composition, according to this invention, is comprised of dispersed epoxy resin particles in water. An epoxy resin that may be suitable include those known in the art, such as those described on pages 322 to 338 of *Encyclopedia of Polymer Science and Engineering*, Vol. 6, Eds. H. F. Mark et al., John Wiley and Sons, N.Y., 1986. The epoxy resin may be a solid or liquid epoxy resin. Preferably the epoxy resin is a liquid that is dispersed (i.e., emulsified) within the water. Exemplary epoxy resins include diglycidyl ether of bisphenol A, such as those available from The Dow Chemical Company, Midland, Mich. under the trade name D.E.R.™, and from Shell Chemical Company, Houston, Tex. under the trade name EPON™ or EPI-REZ™ and phenol and cresol epoxy novolacs, such as those available under the trade name D.E.N. from The Dow Chemical Company, Midland, Mich. Other examples of useful epoxy resins include those described in U.S. Pat. Nos. 5,118,729; 5,344,856 and 5,602,193, each incorporated herein by reference. Preferably the epoxy resin is an epoxy resin of the reaction product of bisphenol A and epichlorohydrin. More preferably the epoxy is the reaction product of bisphenol A and epichlorohydrin where the reaction product has an average molecular weight of at most about 500 and more preferably a molecular weight of at most about 400.

The epoxy resin particles dispersed within the water have a neutral or positive surface charge. The neutral or positive surface charge of the particles dispersed in the water has been found to be critical in adhering the epoxy resin to a metal surface, particularly those surfaces having a negative charge (e.g., ferrous metals) at the pH of the coating composition. The neutral or positive charge also has been found to be critical in being able to disperse fillers (e.g., pigments, such as silica and molybdenum disilicide) and coat metal substrates with coating compositions containing fillers, described later herein. The charge of the particles in the water dispersion may be determined qualitatively by placing a negative and positive electrode in the coating composition and observing which electrode the epoxy particles migrate to.

The epoxy particles may have any particle size useful to form, for example, a corrosion resistant coating on a metal substrate. It is also desirable for the epoxy particles to be of a size that forms a water dispersion that is sufficiently stable to be stored over a substantially long period of time, such as weeks, months or even a year, without substantially coagulating (i.e., more than doubling of the average particle size of the epoxy particles in the dispersion). Generally, the particles of the epoxy are at most about 50 micrometers in diameter with an average particle size of at most about 30 micrometers. Preferably the average particle size of the epoxy is at most about 25 micrometers, more preferably the average size is at most about 10 micrometers, even more preferably the average size is at most about 1 micrometer and most preferably at most about 0.8 micrometer to preferably at least about 5 nanometers.

The amount of epoxy resin in the coating composition may be any amount sufficient to coat a metal substrate that, subsequently, can be cured to form a corrosion resistant coating on the metal. Generally, the amount of epoxy resin is at least about 10 percent by weight to at most about 90 percent by weight of the total composition weight. Preferably the amount of the epoxy resin is at least about 15 percent, more preferably at least about 20 percent and most preferably at least about 25 percent to preferably at most about 90 percent, more preferably at most about 75 percent and most preferably at most about 55 percent by weight of the total weight of the coating composition.

The coating composition also contains a surfactant that forms an epoxy resin in water dispersion, wherein the epoxy resin dispersed particles have a neutral or positive surface charge, the surfactant being a nonionic surfactant, amphoteric surfactant or mixture thereof. The nonionic surfactant may be, for example, a nonionic surfactant or combination of surfactants known to form oil in water emulsions, such as a nonionic surfactant or surfactants having an HLB number of about 8 to about 18. The HLB (hydrophile-lipophile balance) number is the number assigned to a surfactant or combination of surfactants describing the lipophilic and hydrophilic portions of the surfactants as described by W. C. Griffin, *J. Soc. Cosmet. Chem.*, Vol. 1, page 311, incorporated herein by reference.

Exemplary nonionic surfactants include a polyglycol ether of an epoxy, an alcohol, a fat, an oil, a fatty acid, a fatty acid ester or an alkylphenol. Preferably the surfactant is a natural surfactant, such as acacia, gelatin, lecithin or cholesterol, or a synthetic surfactant, such as any one of the polyglycol ether of epoxies or fatty acid esters available from Aldrich Chemicals, Milwaukee, Wis., or under the trade name TWEEN and SPAN from ICI Surfactants, Wilmington, Del. More preferably the surfactant is a natural surfactant and most preferably lecithin or a polyglycol ether of bisphenol A epoxy or epoxy novolac (e.g., $(CH_3)_2C\{C_6H_4[OCH_2CH(OH)CH_2 (OC_2H_4)_nOH]\}_2$), available from Aldrich Chemical Company, Milwaukee, Wis. Exemplary amphoteric surfactants include those known in the art, such as alkyl betaines and dihydroxyethyl glycinates. An example of a preferred amphoteric surfactant is Mirataine™, available from Rhone-Poulenc, Cranbury, N.J.

The amount of surfactant present in the coating composition may be any amount sufficient to disperse the epoxy resin and cause the epoxy resin particles in the dispersion to have a neutral or positive charge. Generally, the amount of surfactant is at least about 0.5 percent by weight to at most about 5 percent by weight of the total coating composition weight. Preferably the amount of the epoxy resin is at least about 0.75 percent, more preferably at least about 1 percent and most preferably at least about 1.5 percent to preferably at most about 5 percent, more preferably at most about 4 percent and most preferably at most about 3 percent of the total weight of the coating composition.

The coating composition also contains a latent curing agent. The latent curing agent must be at least partially soluble in water at room temperature, wherein partially soluble means at least 50% by volume of the latent curing agent is dissolved in the water of the coating composition. Preferably the latent curing agent is completely dissolved within the water of the coating composition. The latent curing agent must also be essentially insoluble in the epoxy resin. Essentially insoluble means that the curing agent fails to dissolve to any degree, such that cross-linking (i.e., curing) of the epoxy essentially fails to occur at room temperature or, in other words, the coating won't cure over long periods of time, such as a few months or more, at room temperature. Examples of latent curing agents include dicyandiamide and blocked isocyanates, such as an alcohol-blocked toluene diisocyanate. Preferably the latent curing agent is dicyandiamide.

The amount of latent curing agent is an amount ufficient to cure the epoxy resin and generally should be an amount that is not so great that the coating, after curing, fails to provide improved corrosion resistance of a metal substrate. Generally, the amount of latent curing agent is at least about 1 percent to at most about 5 percent by weight of the total coating composition weight. Preferably the amount of the latent curing agent is at least about 1.2 percent, more preferably at least about 1.4 percent and most preferably at least about 1.5 percent to preferably at most about 4 percent, more preferably at most about 3.5 percent and most preferably at most about 3 percent by weight of the total weight of the coating composition.

The coating composition, of course, contains water in an amount sufficient, for example, to provide an epoxy in water emulsion when the epoxy is a liquid. The water should also be sufficiently pure to provide a water matrix that fails to cause coagulation of the particles (e.g., epoxy or filler particles) due, for example, to impurities (e.g., ionic impurities).

The amount of water is not critical as long as the epoxy particles are well dispersed and the coating composition has a suitable viscosity for application to a substrate. Generally, the amount of water may be from about 10 percent to about 90 percent by weight of the total composition weight. Preferably the amount of water is at least about 30 percent, more preferably at least about 40 percent and most preferably at least about 50 percent to preferably at most about 80 percent, more preferably at most about 75 percent and most preferably at most about 70 percent by weight of the total weight of the coating composition.

The coating may further be comprised of fillers that impart, for example, opacity or improved wear resistance to the coating composition after it has been cured. Exemplary fillers include ceramic particles or whiskers and known surface treated metal pigments. Preferably the filler is a ceramic selected from the group consisting of oxides, borides, nitrides, carbides, hydroxides, carbonates, silicides, silicates and alloys thereof. Preferably the filler is a ceramic selected from the group consisting of $SnO_2$, ZnO, $TiO_2$, $SiO_2$, $Si_3N_4$, $SiO_2$ coated with $Al_2O_3$, clay (e.g., kaolin), SiC, $B_4C$, $Al(OH)_3$, $AlO_2H$, $Al_2O_3$ and $MoSi_2$. More preferably the filler is a ceramic, such as SiC, $SiO_2$, $B_4C$ and kaolin. Particularly useful ceramics include those available as aqueous sols such as silica sols and aluminum oxide doped silica sols (i.e., $SiO_2$ particles having an $Al_2O_3$ rich surface), available under the trade name LUDOX™ from Dupont deNemours Inc., Wilmington, Del.

The fillers may have any particle size that is useful in improving, for example, the wear resistance or opacity of the cured coating. Generally, the particles of the filler are at most about 50 micrometers in diameter with an average particle size of at most about 30 micrometers. Preferably the average particle size of the filler or fillers is at most about 25 micrometers, more preferably the average size is at most about 10 micrometers, even more preferably the average size is at most about 1 micrometer and most preferably at most about 0.8 micrometer to preferably at least about 5 nanometers (nm).

When the filler is present in the coating composition, it has been surprisingly found that the article charge on the filler should be negative when coating a metal object that has a negative surface charge at the pH of the coating composition. It is surprising that the filler should be negative because it would be expected that the dispersion of epoxy particles having a neutral or positive charge would coagulate with the neutral or positively surface charged filler particles. Even more surprising is that when the filler has the same charge as the epoxy, the filler and epoxy separate upon coating a metal substrate using a technique, such as spin coating, whereas the coating composition having oppositely charged filler and epoxy particles form a homogeneous and uniform coating on the substrate. The polarity of the surface charge of the filler may be determined by the previously described method for determining the charge polarity of the epoxy particles or a known method for determining electrokinetic behavior of solid particles in a liquid (e.g., electrophoresis).

When the coating composition contains the filler, the filler is generally present in an amount of about 5 percent to about 50 percent by weight of the total coating composition weight. Preferably the amount of the filler, when present, is at least about 7 percent, more preferably at least about 8 percent and most preferably at least about 10 percent to preferably at most about 40 percent, more preferably at most about 35 percent and most preferably at most about 30 percent by weight of the total weight of the coating composition.

If desired, the coating composition may also contain a cross-linking catalyst, for example, to increase the rate of cross-linking (i.e., cure) of the epoxy at a temperature. Generally, the catalyst may be, for example, a tertiary amine or imidazole. Examples of the catalyst that may be employed in the coating composition include 2-methylimidazole, benzyldimethylamine, dimethyl aminomethyl phenol and tris(dimethylaminomethyl)phenol. Preferably the catalyst is 2-methylimidazole.

When the coating composition contains the catalyst, the catalyst is generally present in an amount of about 0.001 percent to about 1 percent by weight of the total coating composition weight. Preferably the amount of the catalyst, when present, is at least about 0.002 percent, more preferably at least about 0.005 percent and most preferably at least about 0.01 percent to preferably at most about 0.7 percent, more preferably at most about 0.5 percent and most preferably at most about 0.3 percent by weight of the total weight of the coating composition.

If necessary or desired, the coating composition may also contain a small amount of defoamer. The defoamer may be any suitable defoamer, such as those known in the art. Exemplary defoamers include siloxane based defoamers available from Dow Corning Corp., Midland, Mich. The defoamer, when present, is present only in a quantity necessary to control the foaming of the coating composition, since it has been found that, in general, the defoamer impedes the adherence of the coating composition to a metal substrate. The amount of defoamer, when present, is generally present in an amount of at most about 0.1 percent, more preferably at most about 0.05 percent and most preferably at most about 0.01 percent by weight of the total weight of the coating composition.

Generally, the coating composition has a pH that is at most about 7 to facilitate the formation of a stable dispersion of this invention. Preferably the pH of the coating composition is about 2 to about 7. More preferably the pH of the coating composition is about 3 to about 6. Most preferably the pH of the coating composition is about 3.5 to about 5.5. The viscosity of the coating composition should be a viscosity that allows the composition to be easily applied by known and conventional techniques, such as brushing, spin coating, spraying and dipping.

The rheological behavior is desirably fluid enough to be easily applied to a substrate but not so fluid that it drips or runs off the substrate before curing. In general, the viscosity of the coating composition is about 10 centipoise (cp) to about 5,000 cp at a shear rate of about 15 $s^{-1}$. Preferably the viscosity of the coating composition is at least about 25 cp, more preferably at least about 50 cp, and most preferably at least about 100 cp to preferably at most about 4000 cp, more preferably at most about 3000 cp, even more preferably at most about 2000 cp, and most preferably at most about 1000 cp. To aid in forming a uniform and drip free coating before curing, the coating composition preferably displays thixotropic or shear thinning behavior.

Preparation of the Coating Composition

To prepare the coating composition, any sequence of mixing the constituents sufficient to form the coating composition may be employed. The mixing or emulsification technique employed may be any suitable technique, such as those known in the art. Exemplary mixing techniques include ball milling, high shear mixing, sonic mixing, attritor milling and rapid shaking. When forming a dispersion of a liquid epoxy (i.e., emulsion), it is preferred that an apparatus that causes high shear be used. When forming a dispersion of a solid epoxy, it is preferred that a milling technique be used to form the coating composition.

In a preferred preparation method, the surfactant is first dissolved in the epoxy, for example, if necessary, by heating them together then adding water and mixing, for example, by sonic agitation or high shear homogenization sufficient to form a stable dispersion (i.e., emulsion when the epoxy is a liquid) of epoxy particles in the water. The latent curing agent is then dissolved in water in a separate container. The dissolved curing agent-water solution is, subsequently, added and mixed with the epoxy water dispersion forming the coating composition. At any point in the process, the pH of the epoxy dispersion, curing agent-water solution or coating composition may be adjusted to a different pH, for example, with an acid, such as a mineral acid (e.g., HCl). When other constituents, such as filler, are desired, they are preferably mixed into the water-latent curing agent solution before mixing with the epoxy in water dispersion.

Coating a Metal Substrate

When coating a metal substrate with the coating composition of the present invention, the coating composition is first applied to the metal using any suitable technique, such as spraying, spin coating, brushing, electro-deposition, dipping or rolling. The applied coating should cover the area of the metal substrate that is desired to be coated (i.e., a portion of the metal substrate). As an illustration, the coating may be applied to only the outer surface of a can. The coated metal is then heated to a temperature sufficient to cure the coating into a cured coating adhered to the metal.

The coating, when applied, should be sufficiently thick to provide a corrosion and wear resistant cured coating adhered to the metal after the applied coating is cured. This applied coating generally is at least about 1 micrometer to about 100 micrometers thick.

The metal substrate that is coated is desirably a metal substrate that has a negative surface charge in water at the pH of the coating composition being applied. The metal may be a transition metal, aluminum, magnesium, beryllium or a rare earth metal. Preferably the metal substrate is a transition metal. More preferably the metal is tin, tin alloy, iron or iron alloy. Most preferably the metal is a cast iron.

The metal substrate is desirably free of contaminants, such as petroleum greases and oils, that may cause the cured coating to be insufficiently adhered to the metal substrate. Consequently, it may be desirable, prior to applying the coating composition, to clean the metal substrate. Exemplary cleaning methods include solvent cleaning, emulsion cleaning, alkaline cleaning, acid cleaning, pickling, salt bath descaling ultrasonic cleaning, roughening (e.g., abrasive blasting, barrel finishing, polishing and buffing, chemical etching and electro-etching), as described in Chapter 7 of *Handbook of Tribology, Materials, Coating and Surface Treatments*, B. Bhushan and B. K. Gupta, McGraw-Hill, Inc., New York, 1991, incorporated herein by reference. Preferably the cleaning method is by washing with either an aqueous-detergent solution, such as those known in the art, or a solvent, such as a chlorinated solvent (e.g., methylene chloride), ketone (e.g., acetone) or alcohol (e.g., methanol), toluene or sand blasting.

The metal substrate may also be pretreated to enhance the adhesion of the epoxy coating composition after curing. The pretreatment may be, for example, the formation of an interlayer on the metal substrate surface that enhances adhesion of the coating composition after curing. For example, the interlayer may be a chemical conversion layer (i.e., coating), such as a phosphate, chromate, or oxide coating as described on pages 6.16–6.18 of *Handbook of Tribology, Materials, Coating and Surface Treatments*, B. Bhushan and B. K. Gupta, McGraw-Hill, Inc., New York, 1991, previously incorporated herein by reference.

The interlayer may be any thickness sufficient to enhance the adhesion of the epoxy coating composition during application and after curing but, in general, the interlayer is at most about 10 percent of the thickness of the cured coating of the coating composition. The interlayer, typically, is between about 0.1 to about 10 micrometers thick.

The metal substrate may be an item, such as a brake component (e.g., brake rotor), metal building item, such as an iron rod, can, drum, handle of a hand tool, bolt, nut, screw, marine item (e.g., anchor) or any other metal item, that could benefit from improved corrosion resistance, wear resistance or aesthetic appearance. Preferably the metal substrate is a brake rotor or can.

Even though the water of the coating composition applied to the metal substrate may be removed by drying in air at room temperature, it is preferred that at least a portion of the water is removed when heating to cure the applied coating. The applied coating is heated to a temperature sufficient to cure the applied coating. The particular temperature is dependent on such things as the particular epoxy, curing agent and catalyst employed and curing time desired. The temperature, however, should not be so great that the cured coating is degraded, for example, by decomposing. Generally, the temperature is at least about 50° C. to at most about 400° C. Preferably the temperature is at least about 80° C., more preferably at least about 100° C. and most preferably at least about 120° C. to preferably at most about 300° C., more preferably at most about 250° C. and most preferably at most about 225° C.

The time at the temperature of cure may be any practicable time and is desirably as short as practical. Generally, the time at the curing temperature is at least about 1 minute to at most about 24 hours. Preferably the time at the cure temperature is at least about 5 minutes, more preferably at least about 10 minutes and most preferably at least about 15 minutes to preferably at most about 12 hours, more preferably at most about 4 hours and most preferably at most about 2 hours.

After curing the applied coating composition, a metal substrate having a cured epoxy resin coating adhered thereto is formed generally having improved corrosion resistance. Also, the coating that is formed, typically, has improved wear resistance compared to prior art water-borne epoxy resin coatings. As an illustration, a coated cast iron substrate, such as a brake rotor, passes 168 hours of salt spray corrosion test described by ASTM B-117-90 and also passes cross hatch peel adherence test ASTM D3359-93. It is surprising the coating composition passes these tests in the absence of a primer or interlayer, particularly, on a cast iron substrate absent a primer or interlayer described herein.

The following Examples are solely for illustrative purposes and are not to be construed as limiting the scope of the present invention.

EXAMPLES

Example 1

In a beaker, 10 parts by weight (pbw) of lecithin was dissolved in 200 pbw of poly(bisphenol A-coepichlorohydrin) epoxy having a molecular weight of about 370–410, available from The Dow Chemical Company, Midland, Mich. under the trade name D.E.R.362™, by heating to about 40° C. while stirring.

Once the lecithin is dissolved in the epoxy and after cooling to room temperature, 140 pbw of deionized water was added to the epoxy-lechithin mixture and an epoxy in water emulsion was then made by agitating using a 700 watt high intensity ultrasonic probe at full power for about 5 minutes.

In a second beaker, 340 pbw of deionized water, 38 pbw of a 1 percent by weight dimethylpolysiloxane in water emulsion (available from Dow Corning Corp., Midland, Mich., under the trade name DOW CORNING ADDITIVE 65™), 2 pbw of tris(dimethylaminomethyl)phenol (available from Aldrich Chemical Company, Milwaukee, Wis.), 20 pbw of dycyandiamide (available from Aldrich Chemical Company, Milwaukee, Wis.), 340 pbw of a 20 percent by weight $AlO_2H$ sol. in pH 4 water (available from Johnson Mathey Company, Ward Hill, Mass.), and 60 pbw of $MoSi_2$ having an average particle size of about less than about 2 micrometers (available from Aldrich Chemical Company, Milwaukee, Wis.) were mixed for about 10 minutes using the same 700 watt ultrasonic probe at full power.

The contents of the second beaker were then added to the first beaker and, subsequently, mixed for about 10 minutes using an impeller disperser at low speed to form the water-borne epoxy resin coating composition.

A gray cast iron brake rotor having a diameter of about 11 inches (about 28 cm) was cleaned by wiping the surface with a rag soaked with acetone. After the acetone evaporated from the rotor, the coating composition was applied by dipping the rotor in the coating composition followed by spinning the dipped rotor at about 200 rpm to form a uniform applied coating. The rotor with the applied coating was then heated to 200° C. in about 20 minutes and maintained at 200° C. for about 10 minutes to cure the coating.

After cooling the rotor having the cured coating adhered thereto to room temperature, the cured coating displayed good wet and dry adhesion to the rotor. The coating was opaque and black in color. The coating essentially failed to dissolve in acetone, a 1N HCl solution and a 1N KOH solution when exposed to these for about 30 minutes. That is to say, there was neither visible degradation of the coating observable with the naked eye nor loss in weight amounting to more than about 1 percent by weight of the coating. The coating passed 168 hours of salt spray corrosion test described by ASTM B-117-90 and also passed cross hatch peel adherence test ASTM D3359-93.

Example 2

In a single container, 150 pbw of Epirez™ 3510-W-60 (a nonionically dispersed 50–60 percent by weight epoxy resin in water emulsion, available from Shell Chemical Comp., Houston, Tex.), 250 pbw deionized water, 10 pbw dicyandiamide, 30 pbw of a 34 percent by weight $SiO_2$ sol. in water having a pH of about 5 to 6 (available from Dupont deNemours Inc., Wilmington, Del. under the trade name Ludox™ TMA), 60 pbw of SiC having an average particle size of about 0.6 micrometer in diameter (available from Superior Graphite, Chicago, Ill. under the trade name HSC™-059) and 30 pbw kaolin (available from Aldrich Chemical Company, Milwaukee, Wis.) were ultrasonically agitated for about 10 minutes using an ultrasonic probe at 200 watts power input followed by stirring with a 2 inch diameter impeller rotated at about 200 rpm for about 120 minutes to form a water-borne epoxy resin coating composition.

A gray cast iron brake rotor having a diameter of about 11 inches (about 28 cm) was cleaned by wiping the surface with a rag soaked with acetone. After the acetone evaporated from the rotor, the coating composition was applied by dipping the rotor in the coating composition followed by spinning the dipped rotor at about 200 rpm for about 1 minute to form a uniform applied coating. The rotor with the applied coating was then heated to 190° C. in about 5 minutes and maintained at 190° C. for about 25 minutes to cure the coating.

After cooling the rotor having the cured coating adhered thereto to room temperature, the cured coating displayed good wet and dry adhesion to the rotor. The coating was opaque and gray in color. The coating failed to dissolve in acetone, a 1N HCl solution and a 1N KOH solution when exposed to said solvent, acid or base solution for about 30 minutes. The coating passed 168 hours of salt spray corrosion test described by ASTM B-117-90 and also passed cross hatch peel adherence test ASTM D3359-93.

What is claimed is:

1. A water-borne epoxy resin coating composition comprised of
   (a) particles of an epoxy resin having a neutral or positive surface charge dispersed in (b) water, (c) an amount of surfactant sufficient to disperse the epoxy resin in the water, the surfactant being a nonionic surfactant, amphoteric surfactant or mixture thereof and (d) a latent curing agent that is (i) completely dissolved in the water, (ii) essentially insoluble with the epoxy resin and (iii) present in a sufficient amount to cure the epoxy resin.

2. The coating composition of claim 1 wherein the latent curing agent is selected from the group consisting of dicyandiamide and blocked isocyanates.

3. The coating composition of claim 2 wherein the latent curing agent is dicyandiamide.

4. The coating composition of claim 1 further comprised of a filler.

5. The coating composition of claim 4 wherein the filler has a negative surface charge.

6. The coating composition of claim 4 wherein the filler is a ceramic.

7. The coating composition of claim 6 wherein the ceramic is silica, silicon nitride, silicon carbide, kaolin, aluminum hydroxide, silica doped with alumina, silicon hydroxide or molybdenum disilicide.

8. The coating composition of claim 1 further comprising at least one constituent selected from the group consisting of a defoamer and a curing catalyst.

9. The coating composition of claim 1 wherein the surfactant is a natural surfactant.

10. The coating composition of claim 9 wherein the natural surfactant is lecithin, acacia, cholesterol or gelatin.

11. The coating composition of claim 10 wherein the natural surfactant is lecithin.

12. The coating composition of claim 1 wherein the surfactant is the nonionic surfactant.

13. The coating composition of claim 12 wherein the nonionic surfactant is one or a combination of nonionic surfactants that have an HLB number of about 8 to about 18.

14. The coating composition of claim 13 wherein the nonionic surfactant is a polygylcol ether of a fatty acid ester or an ethoxylated epoxy.

15. A method of coating a metal substrate, the method comprising:
   applying the coating composition of claim 1 to at least a portion of the metal substrate to form a substrate having an applied coating and
   heating the metal substrate having the applied coating to a temperature sufficient to cure the coating composition into a cured coating adhered to the metal substrate.

16. The method of claim 15 wherein the metal substrate is an iron or iron alloy.

17. The method of claim 16 wherein the metal substrate is a brake rotor.

18. A metal article comprising a cured coating of the coating composition of claim 1 adhered to at least a portion of a metal substrate.

19. The metal article of claim 18 wherein the cured coating passes cross hatch peel test ASTM D3359-93.

20. The metal article of claim 18 wherein the cured coating survives a 168 hour salt spray as per ASTM B-117-90 standard.

21. The metal article of claim 18 wherein the metal substrate is a cast iron brake rotor.

22. A water-borne epoxy resin coating composition comprised of
(a) particles of an epoxy resin having a neutral or positive surface charge dispersed in (b) water, (c) an amount of surfactant sufficient to disperse the epoxy resin in the water, the surfactant being a nonionic surfactant, amphoteric surfactant or mixture thereof, (d) a filler that has a negative surface charge and (e) a latent curing agent that is (i) at least partially dissolved in the water, (ii) essentially insoluble with the epoxy resin and (iii) present in a sufficient amount to cure the epoxy resin.

* * * * *